United States Patent
Liu et al.

(10) Patent No.: US 11,184,038 B2
(45) Date of Patent: Nov. 23, 2021

(54) ANTENNA CIRCUIT, COUPLING MODULE FOR ANTENNA SWITCHING, AND WIRELESS COMMUNICATION DEVICE

(71) Applicant: ZTE CORPORATION, Guangdong (CN)

(72) Inventors: Fengpeng Liu, Guangdong (CN); Dongmei Liu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 130 days.

(21) Appl. No.: 16/605,209

(22) PCT Filed: Dec. 22, 2017

(86) PCT No.: PCT/CN2017/117966
§ 371 (c)(1),
(2) Date: Oct. 14, 2019

(87) PCT Pub. No.: WO2018/205630
PCT Pub. Date: Nov. 15, 2018

(65) Prior Publication Data
US 2021/0126660 A1   Apr. 29, 2021

(30) Foreign Application Priority Data

May 12, 2017   (CN) .......................... 201710336004.0

(51) Int. Cl.
*H04M 1/00*   (2006.01)
*H04B 5/00*   (2006.01)
(Continued)

(52) U.S. Cl.
CPC ............... *H04B 1/006* (2013.01); *H04B 1/48* (2013.01); *H04B 5/02* (2013.01)

(58) Field of Classification Search
None
See application file for complete search history.

(56) References Cited

U.S. PATENT DOCUMENTS 8,019,379 B2 * 9/2011 Rofougaran ............. H04B 1/59
455/552.1
8,238,825 B2 * 8/2012 Rofougaran ............. H03F 3/72
455/41.2
(Continued)

FOREIGN PATENT DOCUMENTS

CN   202111228 U   1/2012
CN   102761639 A   10/2012
(Continued)

OTHER PUBLICATIONS

International search report of PCT Patent Application No. PCT/CN2017/117966 dated Feb. 24, 2018.

*Primary Examiner* — Tuan A Tran (57) ABSTRACT

Disclosed are an antenna circuit, a coupling module for antenna switching, and a wireless communication device. The antenna circuit includes: an antenna, a coupling module and at least two communication modules, wherein the coupling module is electrically connected to the at least two communication modules and is capable of realizing signal transmission with the antenna, so that the at least two communication modules are capable of sharing the antenna at the same time and the at least two communication modules do not interfere with each other while sharing the antenna at the same time.

20 Claims, 6 Drawing Sheets

(51) Int. Cl.
*H04B 1/00* (2006.01)
*H04B 1/48* (2006.01)
*H04B 5/02* (2006.01)

(56) References Cited

U.S. PATENT DOCUMENTS

| | | | |
|---|---|---|---|
| 8,369,889 B2* | 2/2013 | Rofougaran | H03G 3/3068 |
| | | | 455/552.1 |
| 9,002,268 B2* | 4/2015 | Desclos | H04B 5/0075 |
| | | | 455/41.1 |
| 9,160,288 B2* | 10/2015 | Rofougaran | H03F 3/72 |
| 9,356,345 B2* | 5/2016 | Wang | H04M 1/026 |
| 9,564,683 B2* | 2/2017 | Won | H01Q 21/30 |
| 2011/0263214 A1* | 10/2011 | Robinson | H04B 1/0458 |
| | | | 455/88 |
| 2015/0326419 A1* | 11/2015 | Mayer-Zintel | H04B 1/0014 |
| | | | 455/141 |

FOREIGN PATENT DOCUMENTS

| | | |
|---|---|---|
| CN | 106299600 A | 1/2017 |
| EP | 2747200 A1 | 6/2014 |

\* cited by examiner

Fig. 8

ANTENNA CIRCUIT, COUPLING MODULE FOR ANTENNA SWITCHING, AND WIRELESS COMMUNICATION DEVICE

CROSS-REFERENCE TO RELATED APPLICATIONS

This application is proposed based on and claims the priority of the Chinese patent application CN 201710336004.0 filed on May 12, 2017, the entirety of which is incorporated herein by reference.

FIELD OF THE INVENTION

The disclosure relates to communication technology, and in particular, to an antenna circuit, a coupling module for antenna switching, and a wireless communication device.

BACKGROUND OF THE INVENTION

Generally, there are three common forms for a built-in antenna of a wireless communication device: IFA (inverted-F antenna) (for example, PIFA (planar inverted-F antenna)), LOOP antenna, and monopole antenna. Communication modules that need to use an antenna include: 2G (the second generation mobile communication technology), 3G (the third generation mobile communication technology), 4G (the fourth generation mobile communication technology) or 5G (the fifth generation mobile communication technology) wireless communication module; GPS (global positioning system) module; WIFI (wireless-fidelity) module; FM (frequency modulation) module; NFC (near field communication) module and so on.

While a smaller, lighter and thinner structure of the wireless communication device is pursued, there are more and more frequency bands of wireless communication, and requirements for uplink and downlink rates become increasingly higher; requirements for GPS positioning also become increasingly higher and more diversified; requirements for frequency bands and a throughput rate of WIFI become increasingly higher as well; there are still strong demands for FM in many international markets; and application of NFC becomes increasingly wider. In order to meet various antenna communication needs required in the market, it is required that more antenna needs should be achieved in one wireless communication device. Currently, a separate antenna needs to be configured for each antenna need, and thus there are a large number of antennas which take up space. With the development of the wireless communication device for a lighter and thinner structure, it becomes increasingly difficult to use more antennas to meet various communication requirements in the wireless communication device having a limited size and a limited space.

SUMMARY OF THE INVENTION

The following is a summary of the subject matter described in detail herein. The summary is not for the purpose of limiting the protection scope of the claims.

Embodiments of the application provide an antenna circuit, a coupling module for antenna switching, and a wireless communication device so as to realize a plurality of communication modules sharing an antenna at the same time.

Embodiments of the application provide an antenna circuit. The antenna circuit includes: an antenna, a coupling module and at least two communication modules. The coupling module is electrically connected to the at least two communication modules and is capable of realizing signal transmission with the antenna, so that the at least two communication modules are capable of sharing the antenna at the same time and the at least two communication modules do not interfere with each other while sharing the antenna at the same time.

In an exemplary embodiment, the coupling module includes at least two communication module front-end circuits which are mutually coupled. One of communication module front-end circuits is electrically connected to one of the communication modules and is capable of realizing signal transmission with the antenna.

In the exemplary embodiment, the at least two communication module front-end circuits may be coupled in a spatial coupling manner, or in an electrical coupling manner, or in an electrical direct connection plus isolation manner.

In the exemplary embodiment, the coupling module may include a first communication module front-end circuit and a second communication module front-end circuit; the at least two communication modules include a first communication module and a second communication module; the first communication module is electrically connected to the first communication module front-end circuit, and the second communication module is electrically connected to the second communication module front-end circuit; and the first communication module perform signal transmission by using the antenna through the first communication module front-end circuit, and the second communication module perform signal transmission by using the antenna through the second communication module front-end circuit.

In the exemplary embodiment, the first communication module front-end circuit includes an inducer, and the first communication module front-end circuit and the second communication module front-end circuit are coupled in the spatial coupling manner.

In the exemplary embodiment, the second communication module front-end circuit and the antenna form a loop, and the inducer is arranged at an end of the second communication module front-end circuit and is in a central position of the loop, so as to realize signal transmission between the first communication module front-end circuit and the antenna.

In the exemplary embodiment, the at least two communication modules may include: an FM module and an NFC module, and the at least two communication modules realize a low frequency-low power communication requirement by sharing the antenna through the coupling module.

Embodiments of the application further provide a coupling module for antenna switching, which is configured to electrically connect at least two communication modules and is capable of realizing signal transmission with the antenna. The coupling module includes at least two communication module front-end circuits which are mutually coupled. One of the communication module front-end circuits is electrically connected to one of the communication modules and is capable of realizing signal transmission with the antenna, so that the at least two communication modules are capable of sharing the antenna at the same time and the at least two communication modules do not interfere with each other while sharing the antenna at the same time.

In an exemplary embodiment, the at least two communication module front-end circuits may be coupled in a spatial coupling manner, or in an electrical coupling manner, or in an electrical direct connection plus isolation manner.

In the exemplary embodiment, the coupling module may include a first communication module front-end circuit and a second communication module front-end circuit; the at least two communication modules include a first communication module and a second communication module; the first communication module is electrically connected to the first communication module front-end circuit, and the second communication module is electrically connected to the second communication module front-end circuit; and the first communication module performs signal transmission by using the antenna through the first communication module front-end circuit, and the second communication module performs signal transmission by using the antenna through the second communication module front-end circuit.

In the exemplary embodiment, the first communication module front-end circuit includes an inducer, and the first communication module front-end circuit and the second communication module front-end circuit are coupled in the spatial coupling manner.

In the exemplary embodiment, the second communication module front-end circuit and the antenna form a loop, and the inducer is arranged at an end of the second communication module front-end circuit and is in a central position of the loop, so as to realize signal transmission between the first communication module front-end circuit and the antenna.

In the exemplary embodiment, the first communication module may be an FM module, and the second communication module may be an NFC module. The first communication module and the second communication module may realize a low frequency-low power communication requirement by sharing the antenna through the coupling module.

Embodiments of the application further provide a wireless communication device, including the aforementioned antenna circuits.

In the embodiments of the application, a coupling module is arranged between an antenna and at least two communication modules. By means of the coupling module, it is realized that the at least two communication modules share one antenna at the same time, moreover the at least two communication modules do not interfere with each other while sharing one antenna at the same time. In this way, more antenna communication needs may be realized by using a small number of antennas in a same wireless communication device, thereby for the same wireless communication device, a requirement of realizing more antenna communication needs is met. Moreover, the hardware solution of the application is mature, reliable and low-cost.

Other features and advantages of the application will be set forth in the following description, and some of the features will become apparent from the description, or can be learned by implementation of the application. The objectives and other advantages of the application will be realized and obtained through the structure particularly pointed out in the specification, claims and accompanying drawings.

BRIEF DESCRIPTION OF THE DRAWINGS

The accompanying drawings are used for providing further understandings of the technical solution of the application, and constitute one part of the description. The drawings are used for interpreting the technical solution of the application together with embodiments of the application, not for limiting the technical solution of the application. In the drawings.

DETAILED DESCRIPTION OF THE EMBODIMENTS

The embodiments of the application will be explained in detail with reference to the accompanying drawings. It should be understood that, the following embodiments described are only used for describing and explaining the application, rather than limiting the application. It should be noted that, as long as there is no conflict, embodiments of the application and technical features in the embodiments of the application may be combined with each other in any manner.

Figure 1:
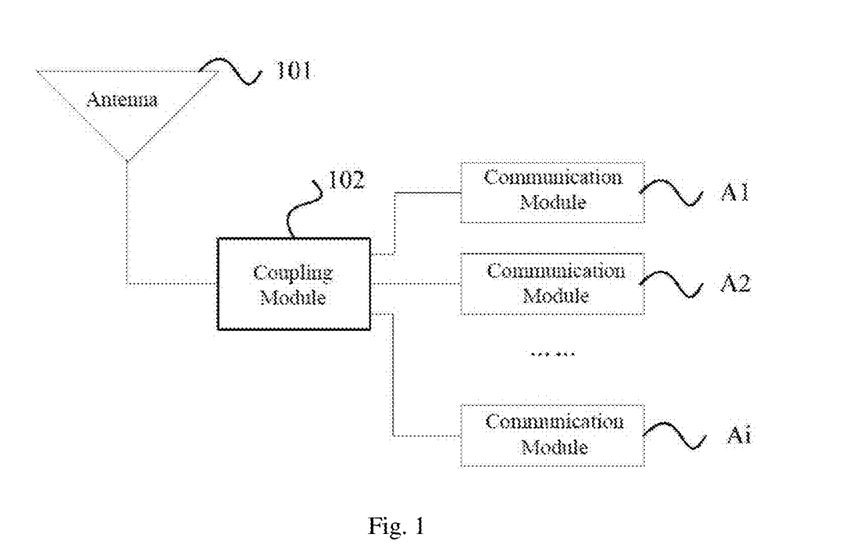
FIG. 1 is a schematic diagram of an antenna circuit provided in embodiments of the application.

As shown in FIG. 1, embodiments of the application provide an antenna circuit, which includes an antenna 101, at least two communication modules A1, A2, . . . , Ai and a coupling module 102. The coupling module 102 is electrically connected to the at least two communication modules A1, A2, . . . , Ai and is capable of realizing signal transmission with the antenna 101, so that the at least two communication modules A1, A2, . . . , Ai are able to share the antenna 101 at the same time and the at least two communication modules A1, A2, . . . , Ai do not interfere with each other while sharing the antenna at the same time, wherein i represents a positive integer. In other words, the coupling module enables the at least two communication modules to transmit-receive signal or information at the same time by sharing one antenna, so as to avoid mutually interference between these communication modules.

It should be noted that "electrically connected" in the application may refer to that objects are connected physically with each other through a wire, a circuit, and the like.

The embodiments of the application provide an antenna circuit. By designing a coupling module between a plurality of communication modules and one antenna, the plurality of communication modules are able to share the antenna at the same time and do not interfere with each other, so as to solve a problem that a wireless communication device cannot provide enough antenna paths when communication requirement of a plurality of paths needs to work at the same time.

Figure 2:
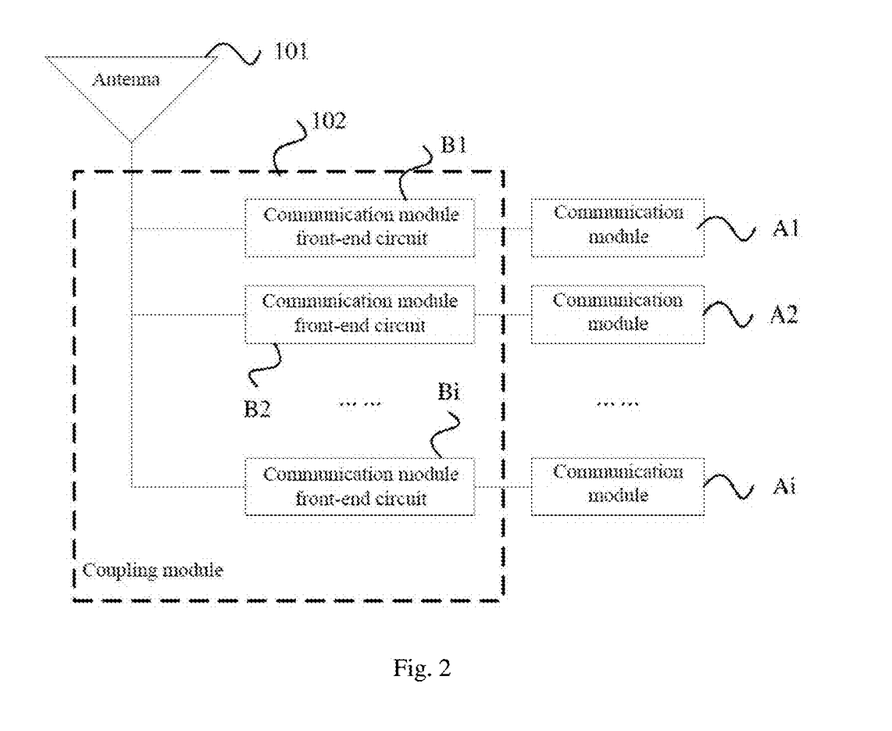
FIG. 2 is a schematic diagram of an antenna circuit provided in embodiments of the application.

As shown in FIG. 2, the coupling module 102 may include at least two communication module front-end circuits B1, B2, . . . , Bi which are coupled with each other, wherein i represents a positive integer. One of the communication module front-end circuits is electrically connected to one of the communication modules and is capable of realizing signal transmission with the antenna 101. In FIG. 2, the communication module front-end circuit B1 is electrically connected to the communication module A1 and is capable of realizing signal transmission with the antenna 101; the communication module front-end circuit B2 is electrically connected to the communication module A2 and is capable of realizing signal transmission with the antenna 101; the communication module front-end circuit Bi is electrically connected to the communication module Ai and is capable of realizing signal transmission with the antenna 101. The communication module front-end circuits B1, B2 and Bi are coupled with each other.

The at least two communication module front-end circuits may be coupled with each other in a spatial coupling manner, or in an electrical coupling manner, or in an electrical direct connection plus isolation manner. For example, when the at least two communication module front-end circuits are coupled with each other in the spatial coupling manner, signal transmission of an electromagnetic field manner can be realized through placement position of spaces between the communication module front-end circuits, so that each communication module front-end circuit is capable of obtaining transmitted information or signals from the antenna and realizes signal or information transmission through the antenna. When the at least two communication module front-end circuits are coupled with each other in the electrical coupling manner, an inductive element, a capacitive element, a combination of an inductive element and an capacitive element, or an integrated circuit having characteristics of the aforementioned three circuits may be used for connections. When the at least two communication module front-end circuits are coupled with each other in the electrical direct connection plus isolation manner, an inducer, a capacitor, a resistor, or a combination of the aforementioned three, or an integrated circuit having formal characteristics of the aforementioned may be used for connections, and the isolation function is realized at the same time.

In an exemplary embodiment, the coupling module may include a first communication module front-end circuit and a second communication module front-end circuit; the at least two communication modules may include a first communication module and a second communication module; the first communication module is electrically connected to the first communication module front-end circuit, and the second communication module is electrically connected to the second communication module front-end circuit; the first communication module performs signal transmission by using the antenna through the first communication module front-end circuit, and the second communication module performs signal transmission by using the antenna through the second communication module front-end circuit.

In an exemplary embodiment, the first communication module front-end circuit may include an inducer, and the first communication module front-end circuit and the second communication module front-end circuit are coupled with each other in a spatial coupling manner.

In an exemplary embodiment, the second communication module front-end circuit and the antenna form a loop, and the inducer of the first communication module front-end circuit is arranged at an end of the second communication module front-end circuit and is in a central position of the loop, so as to realize signal transmission between the first communication module front-end circuit and the antenna.

In the embodiment, antenna communication requirements of the at least two communication modules may be same or different. For example, the antenna communication requirements of the at least two communication modules may be of the same frequency band or of different frequency bands, or may be of wide band or of a mixture of various bandwidths. For example, the communication module may be a 2G wireless communication module, a 3G wireless communication module, a 4G wireless communication module, or a 5G wireless communication module, and is configured to realize a wireless communication function of different frequency bands; the communication module may also be a GPS module and is configured to realize a positioning function, the communication module may also be a WIFI module and is configured to realize a network access function, or be an FM module and is configured to realize a broadcast receiving function, or be an NFC module and is configured to realize a short distance wireless communication function. However, the application does not limit the type of the communication module.

In an exemplary embodiment, the at least two communication modules may include an FM module and an NFC module, and the at least two communication modules realize a low frequency-low power communication requirement by sharing the antenna through the coupling module.

Embodiments of the application further provide a coupling module for antenna switching, the coupling module is configured to electrically connect the at least two communication modules and is capable of realizing signal transmission with the antenna. The coupling module includes at least two communication module front-end circuits which are mutually coupled. One of the communication module front-end circuits is electrically connected to one of the communication modules and is capable of realizing signal transmission with the antenna, so that the at least two communication modules are able to share the antenna at the same time and when the at least two communication modules do not interfere with each other while sharing the antenna at the same time.

The at least two communication module front-end circuits may be coupled with each other in an spatial coupling manner, or in an electrical coupling manner, or in an electrical direct connection plus isolation manner.

In an exemplary embodiment, the coupling module may include a first communication module front-end circuit and a second communication module front-end circuit; the at least two communication modules include a first communication module and a second communication module; the first communication module is electrically connected to the first communication module front-end circuit, and the second communication module is electrically connected to the second communication module front-end circuit; the first communication module performs signal transmission by using the antenna through the first communication module front-end circuit, and the second communication module performs signal transmission by using the antenna through the second communication module front-end circuit.

In an exemplary embodiment, the first communication module front-end circuit may include an inducer, and the first communication module front-end circuit and the second communication module front-end circuit are coupled with each other in the spatial coupling manner. The second communication module front-end circuit and the antenna form a loop, and the inducer of the first communication module front-end circuit is arranged at an end of the second communication module front-end circuit and is in a central position of the loop, so as to realize that the first communication module front-end circuit performs signal transmission by means of the antenna.

In the following, a situation being one antenna, communication requirement of two paths is described as an example.

Figure 3:
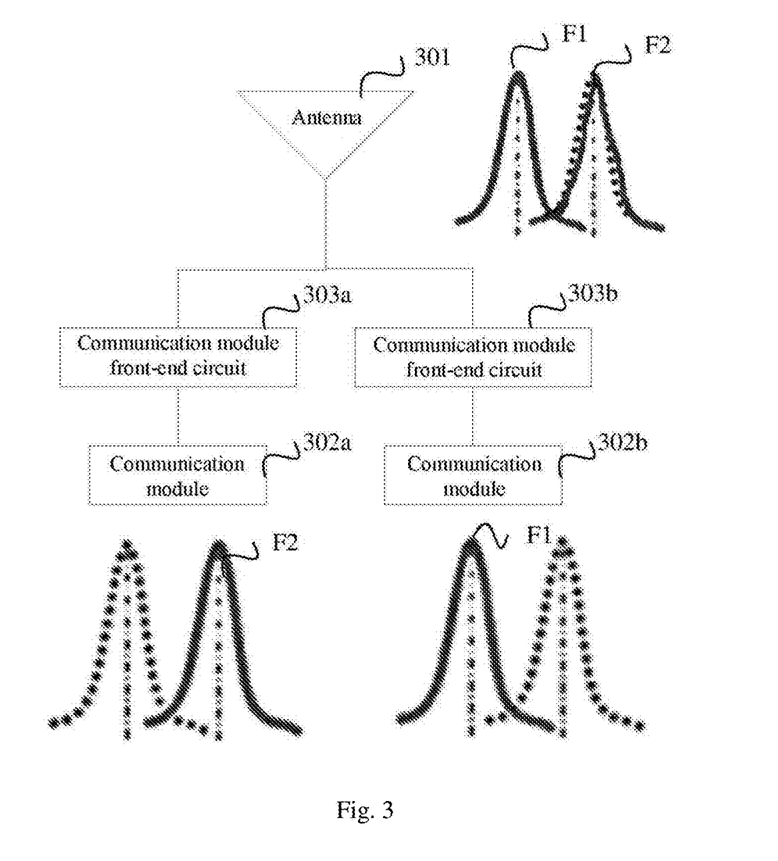
FIG. 3 is a schematic diagram of two communication modules sharing one antenna at the same time provided in embodiments of the application.

As shown in FIG. 3, an antenna 301 may cover frequency bands F1 and F2 of two paths, and two communication modules 302a, 302b are respectively connected to the antenna 301 through communication module front-end circuits 303a, 303b. The communication module 302a may select a needed frequency band, for example, frequency band F2, directly by matching. At the time, the communication module front-end circuit 303a of the communication module 302a is designed as a corresponding matching circuit; and the communication module front-end circuit 303b of the communication module 302b may be coupled with the communication module front-end circuit 303a of the communication module 302a, so as to realize of sharing of the antenna 301 at the same time, thereby obtaining a self-needed frequency band, for example, frequency band F1. In addition, an isolation degree should be taken into consideration for design of the communication module front-end circuits 303a and 303b, so that the communication modules 302a and 302b do not interfere with each other while sharing the antenna 301 at the same time. That is, when the communication module 302a performs information or signal transceiving by means of the antenna 301, there is no influence on the communication module 302b to perform information or signal transceiving by means of the antenna 301; when the communication module 302b performs information or signal transceiving by means of the antenna 301, there is no influence on the communication module 302a to perform information or signal transceiving by means of the antenna 301.

For example, when the antenna 301 is a independent antenna of the communication module 302a, the communication module 302b itself does not have a independent antenna and needs to borrow the antenna 301, the front-end circuit 303b of the communication module 302b may serve as an antenna, the front-end being shared at the same time, similar to an antenna function, and the function of the front-end circuit 303b is to provide a front-end having an antenna function to the communication module 302b. Correspondingly, a transceiving link modification is made to the front-end circuit 303a of the communication module 302a so as to match the front-end circuit 303b of the communication module 302b. In this way, communication modules 302a and 302b sharing the antenna 301 simultaneously are able to perform signal or information receiving and transmitting at the same time, so that communication requirements of multiple paths are met.

It should be noted that the example mentioned above involves two communication requirements working at the same time, but the application does not limit the number of the communication requirements.

In addition, the application does not limit characteristics of the multiple communication requirements. The communication requirement may be of a same frequency band or of different frequency bands, or may be of a wide band or of a mixture of various bandwidths.

The application is described in detail through several embodiments hereinafter.

Embodiment 1

In the embodiment, realization of simultaneously sharing of a low frequency-low power antenna is described.

Figure 4:
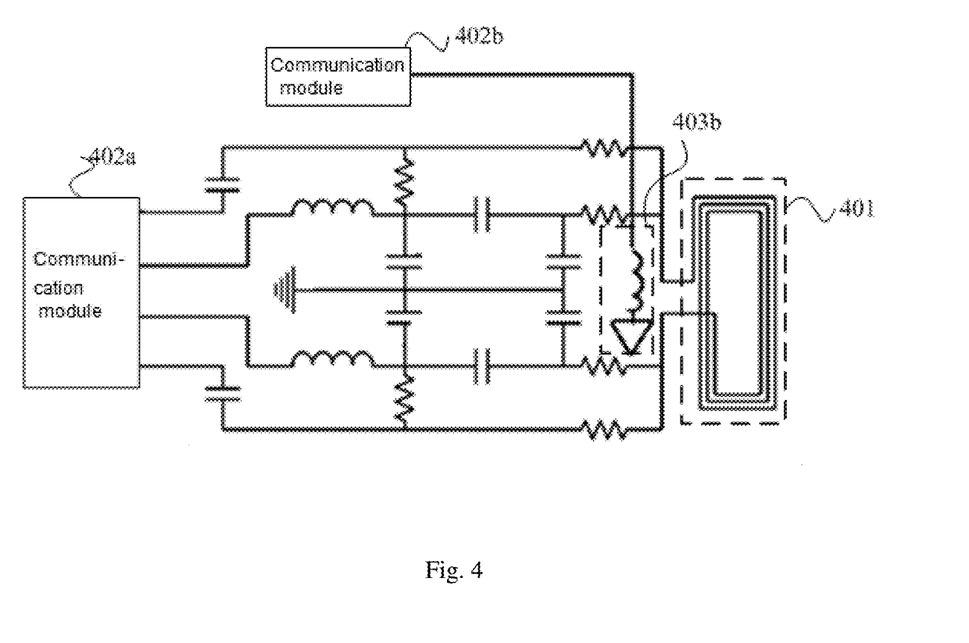
FIG. 4 is a schematic diagram of an antenna circuit according to Embodiment 1 of the application.

As shown in FIG. 4, a coupling module in the embodiment includes the following two section circuit sections. One section is a front-end matching circuit of a communication module 402a (i.e., an original antenna module). This circuit section has a symmetrical structure. After being redesigned, on the basis of meeting its own performance requirements, this circuit section is capable of matching a coupling front-end circuit 403b of a communication module 402b (i.e., a borrowing antenna module) so as to realize performance of the borrowing antenna module. The other section is the front-end circuit 403b of the communication module 402b, which serves as a transceiving node, and is similar to antenna function. The front-end circuit is coupled with the front-end matching circuit of the original antenna module so as to perform transceiving by borrowing an antenna 401.

In the embodiments, the above two mentioned circuit sections should achieve coupling strength and isolation degree in specific physical implementation and adjustment of hardware. Wherein the coupling strength refers to achieving that the efficiency of the antenna borrowing module meets requirements ultimately; and the isolation degree refers to achieving that two communication modules work at the same time and do not interfere with each other.

Figure 5:
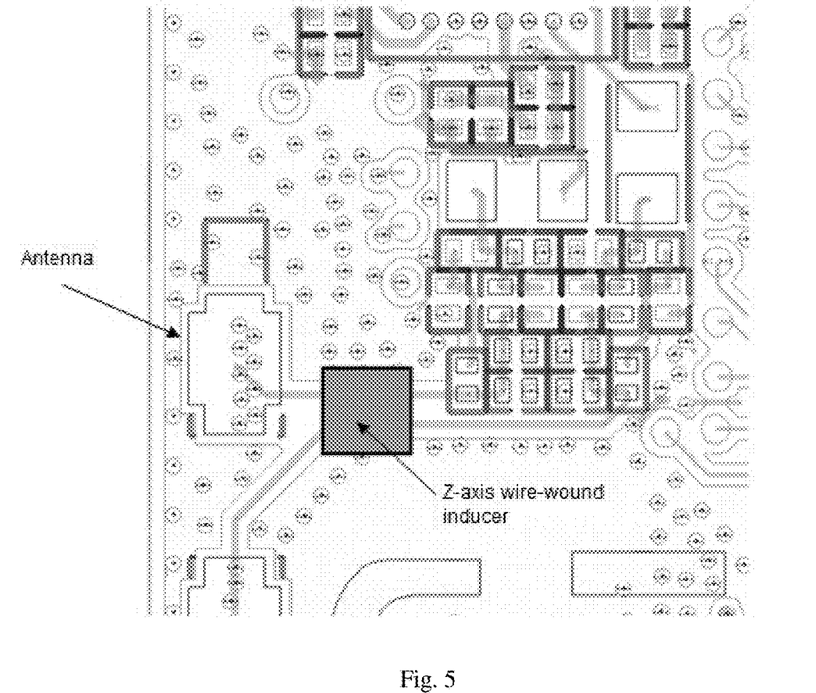
FIG. 5 is a schematic diagram of physical implementation according to Embodiment 1 of the application.

FIG. 5 is a solution of physical implementation of hardware for the circuit shown in FIG. 4. As shown in FIG. 4 and FIG. 5, the borrowing antenna module may use a Z-axis wire-wound inducer as a front-end circuit. An inductance value of the Z-axis wire-wound inducer and parameters of other inducers, capacitors and resistors may be selected according to adjustment situations. The Z-axis wire-wound inducer is designed at a front-end of the original antenna module (i.e., the communication module 402a) and at an end of a circuit matching antenna, and is in a central position of a loop, i.e., a position where field strength is relatively strong, and the Z-axis wire-wound inducer is coupled with an original loop for transceiving of the borrowing antenna module (i.e., the communication module 402b). Besides, an isolation matching circuit may be designed for the original antenna module so as to prevent that the two modules interfere with each other during work.

In the embodiment, there is no physical connection between the front-end circuit of the borrowing antenna module and an original antenna circuit. The Z-axis wire-wound inducer is arranged at a position of the original loop where the field strength is relatively strong, and transceiving is performed by means of the electromagnetic field through borrowing the antenna 401.

Figure 6:
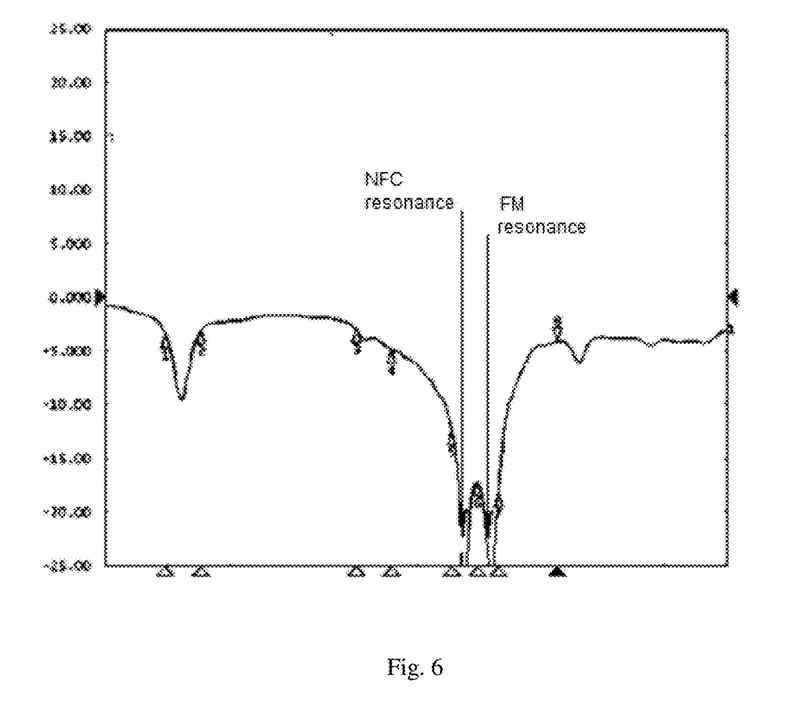
FIG. 6 is a schematic diagram of antenna adjustment according to Embodiment 1 of the application.

In the embodiment, the communication module 402a may be an FM module, and the communication module 402b may be an NFC module; or the communication module 402a may be an NFC module, and the communication module 402b may be an FM module. It can be seen, from practical adjustment of the above design, that the FM module and the NFC module may normally work at the same time without interfering with each other. As shown in FIG. 6, resonance of the antenna simultaneously shared by two communication needs of NFC and FM may satisfy the requirements.

Embodiment 2

In the embodiment, realization of sharing an antenna required by a low frequency communication and a high frequency communication at the same time is described.

Figure 7:
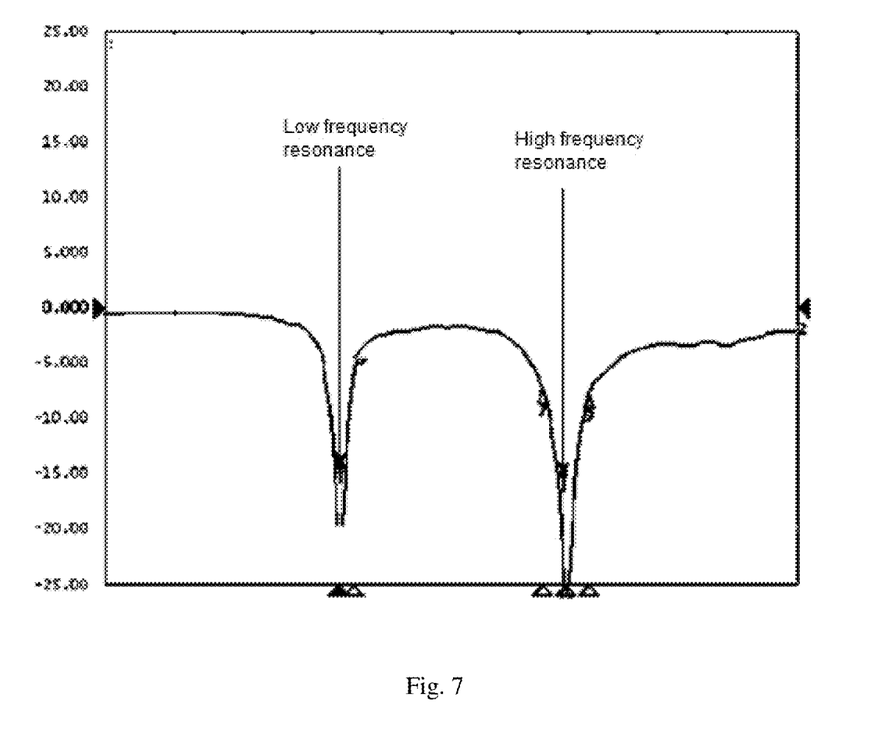
FIG. 7 is a schematic diagram of antenna adjustment according to Embodiment 2 of the application.

For one antenna, ideal resonances corresponding to a low frequency and a high frequency are shown in FIG. 7.

Figure 8:
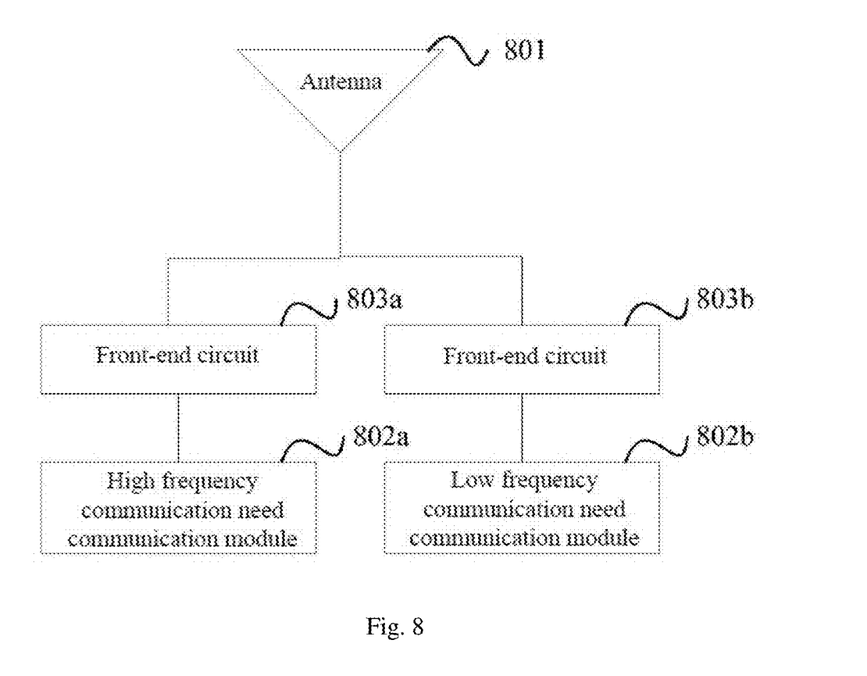
FIG. 8 is a schematic diagram of an antenna circuit according to Embodiment 2 of the application.

As shown in FIG. 8, a coupling module of the embodiment includes the following two circuit sections. One section is a front-end circuit 803a of a communication module 802a of a high frequency communication need (an antenna matching module of the high frequency communication need). After being redesigned, on the basis of meeting its own performance requirements, this circuit section is capable of matching a front-end circuit 803b of a communication module 802b of a low frequency communication need (i.e., a coupling circuit module of the low frequency communication need), so as to realize the performance of a borrowing antenna module (i.e., the communication module 802b). The other circuit section is the front-end circuit 803b of the communication module 802b of the low frequency communication need, which serves as a transceiving node of the low frequency communication need, and is similar to the antenna function. The front-end circuit 803b is coupled with the front-end circuit of an original antenna module (i.e., the communication module 802a) so as to perform transceiving by borrowing an antenna 801.

In the embodiment, after practical adjustment of the aforementioned front-end circuits 803a and 803b, parameters of each circuit element within may be determined, so that low frequency communication requirement and high communication requirement may normally work at the same time by sharing one antenna without interfering with each other.

In addition, embodiments of the application further provide a wireless communication device, comprising an antenna circuit mentioned in the above embodiments. The description of the antenna circuit of the embodiment may refer to the description of the aforementioned embodiments and will not be repeated herein.

To sum up, in the embodiments of the application, by arranging a coupling module between an antenna and at least two communication modules, it is realized that the at least two communication modules simultaneously share one antenna, moreover the at least two communication modules do not interfere with each other while sharing one antenna at the same time. In this way, more antenna communication needs may be realized by using a small number of antennas in a same wireless communication device, thereby for the same wireless communication device, a requirement of realizing more antenna communication needs is met. Moreover, the hardware solution of the application is mature, reliable and low-cost.

The basic principle, main features and advantages of the application have been shown and described above. The application is not limited by the above embodiments, and the above embodiments and description are merely for explaining the principle of the application. Without departing from the spirit and scope of the application, various changes and modifications may be made to the application, and these changes and modifications are all within the claimed scope of the application.

INDUSTRIAL APPLICABILITY

In the technical solution of embodiments of the application, a coupling module is arranged between an antenna and at least two communication modules. By means of the coupling module, it is realized that the at least two communication modules simultaneously share one antenna, moreover the at least two communication modules do not interfere with each other while sharing one antenna at the same time. In this way, more antenna communication needs may be realized by using a small number of antennas in a same wireless communication device, thereby for the same wireless communication device, a requirement of realizing more antenna communication needs is met. Moreover, the hardware solution of the application is mature, reliable and low-cost.

The invention claimed is:

1. An antenna circuit, comprising: an antenna, a coupling module and at least two communication modules, wherein the coupling module is electrically connected to the at least two communication modules and is capable of realizing signal transmission with the antenna, so that the at least two communication modules are capable of sharing the antenna at the same time and the at least two communication modules do not interfere with each other while sharing the antenna at the same wherein the coupling module comprises at least two communication module front-end circuits which are mutually coupled, wherein one of the communication module front-end circuits comprises an inducer.

2. The antenna circuit according to claim 1, wherein one of the communication module front-end circuits is electrically connected to one of the communication modules and is capable of realizing signal transmission with the antenna.

3. The antenna circuit according to claim 2, wherein the at least two communication module front-end circuits are coupled in a spatial coupling manner, or in an electrical coupling manner, or in an electrical direct connection plus isolation manner.

4. The antenna circuit according to claim 2, wherein the coupling module comprises a first communication module front-end circuit and a second communication module front-end circuit; the at least two communication modules comprise a first communication module and a second communication module; the first communication module is electrically connected to the first communication module front-end circuit, and the second communication module is electrically connected to the second communication module front-end circuit; and the first communication module performs signal transmission by using the antenna through the first communication module front-end circuit, and the second communication module performs signal transmission by using the antenna through the second communication module front-end circuit.

5. The antenna circuit according to claim 4, wherein the first communication module front-end circuit comprises the inducer, and the first communication module front-end circuit and the second communication module front-end circuit are coupled in a spatial coupling manner.

6. The antenna circuit according to claim 5, wherein the second communication module front-end circuit and the antenna form a loop, and the inducer is arranged at an end of the second communication module front-end circuit and is in a central position of the loop, so as to realize signal transmission between the first communication module front-end circuit and the antenna.

7. The antenna circuit according to claim 1, wherein the at least two communication modules comprise: a frequency modulation FM module and a near field communication NFC module, and the at least two communication modules realize a low frequency—low power communication requirement by sharing the antenna through the coupling module.

8. A coupling module for antenna switching, wherein the coupling module is configured to electrically connect at least two communication modules and is capable of realizing signal transmission with the antenna, wherein the coupling module comprises at least two communication module front-end circuits which are mutually coupled, wherein one of the communication module front-end circuits is electrically connected to one of the communication modules and is capable of realizing signal transmission with the antenna, so that the at least two communication modules are capable of sharing the antenna at the same time and the at least two communication modules do not interfere with each other while sharing the antenna at the same time, wherein one of the communication module front-end circuits comprises an inducer.

9. The coupling module according to claim 8, wherein the at least two communication module front-end circuits are coupled in a spatial coupling manner, or in an electrical coupling manner, or in an electrical direct connection plus isolation manner.

10. The coupling module according to claim 8, wherein the coupling module comprises a first communication module front-end circuit and a second communication module front-end circuit; the at least two communication modules comprise a first communication module and a second communication module; the first communication module is electrically connected to the first communication module front-end circuit, and the second communication module is electrically connected to the second communication module front-end circuit; the first communication module performs signal transmission by using the antenna through the first communication module front-end circuit, and the second communication module performs signal transmission by using the antenna through the second communication module front-end circuit.

11. The coupling module according to claim 10, wherein the first communication module front-end circuit comprises the inducer, and the first communication module front-end circuit and the second communication module front-end circuit are coupled in a spatial coupling manner.

12. The coupling module according to claim 11, wherein the second communication module front-end circuit and the antenna form a loop, and the inducer is arranged at an end of the second communication module front-end circuit and is in a central position of the loop, so as to realize signal transmission between the first communication module front-end circuit and the antenna.

13. The coupling module according to claim 10, wherein the first communication module is a frequency modulation FM module, and the second communication module is a near field communication NFC module, wherein the first communication module and the second communication module realize a low frequency low power communication need by sharing the antenna through the coupling module.

14. A wireless communication device, comprising an antenna circuit according to claim 1.

15. A wireless communication device, comprising an antenna circuit according to claim 2.

16. A wireless communication device, comprising an antenna circuit according to claim 3.

17. A wireless communication device, comprising an antenna circuit according to claim 4.

18. A wireless communication device, comprising an antenna circuit according to claim 5.

19. A wireless communication device, comprising an antenna circuit according to claim 6.

20. A wireless communication device, comprising an antenna circuit according to claim 7.

* * * * *